United States Patent Office 3,464,896
Patented Sept. 2, 1969

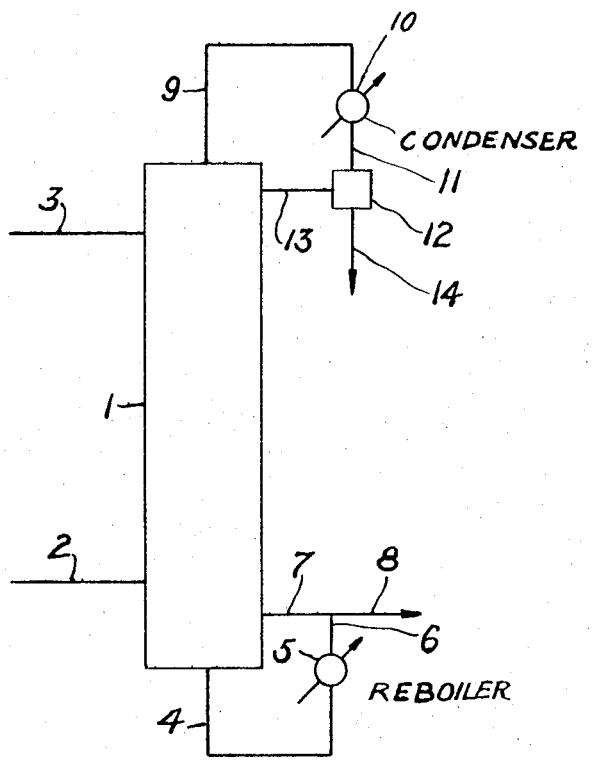

3,464,896
SEPARATION OF WATER FROM A SINGLE ALKANOL BY EXTRACTIVE DISTILLATION WITH ETHYLENE GLYCOL
Thomas A. Washall, Wilmington, Del., assignor to Atlantic Richfield Company, Philadelphia, Pa., a corporation of Pennsylvania
Filed Feb. 2, 1968, Ser. No. 702,549
Int. Cl. B01d 3/40; C07c 29/30
U.S. Cl. 203—18        4 Claims

ABSTRACT OF THE DISCLOSURE

Method for the separation of water from $C_3$ to $C_7$ monohydric alcohols by extractive distillation with diols.

BACKGROUND OF THE INVENTION

Field of the invention

This invention relates to a method for the extractive distillation of $C_3$ to $C_7$ monohydric alcohols using diols to remove water from such alcohols.

Prior art

No prior art is known which shows the instant invention of extractive distillation for drying $C_3$ to $C_7$ monohydric alcohols using diols to remove water from the alcohols.

SUMMARY OF THE INVENTION

In accordance with this invention water is removed from $C_3$ to $C_7$ monohydric alcohols by extractive distillation of the alcohol utilizing a diol such as ethylene glycol, propylene glycol or the like.

The invention is further described by means of the drawing wherein the sole figure shows a schematic outline of one embodiment of the process.

It is an object of this invention, therefore, to provide a method for the separation of water from $C_3$ to $C_7$ monohydric alcohols.

It is another object of this invention to provide a method for the removal of water from $C_3$ to $C_7$ monohydric alcohols by extractive distillation with a diol.

Other objects of this invention will be apparent from the description of the preferred embodiments which follow and from the claims.

DESCRIPTION OF THE PREFERRED EMBODIMENTS

This invention is applicable to the removal of water from monohydric alcohols having 3 to 7 carbon atoms and includes the normal, iso-, secondary and tertiary compounds. Examples of these are, n-propyl alcohol, isopropyl alcohol, n-butyl alcohol, isobutyl alcohol, secondary butyl alcohol, tertiary butyl alcohol, n-amyl alcohol, isoamyl alcohol, secondary isoamyl alcohol, secondary amyl alcohol, tertiary amyl alcohol and the various hexyl and heptyl alcohols. These alcohols all form minimum boiling azeotropes with water. Since the azeotropes boil below the the normal boiling points of the corresponding alcohols it is impossible to dry the total stream of such alcohol by ordinary distillation.

For example, normal butyl alcohol forms an azeotrope with water which boils at about 93° C. and contains about 42.5 percent water. The alcohol itself boils at 117.7° C. Tertiary butyl alcohol forms an azeotrope containing approximately 11.7 weight percent water and boils at 79.9° C. Tertiary butyl alcohol itself boils at 82.8° C. Similar azeotropes with water are known for the other alcohols. It is clear, therefore, that it is impossible to dry these alcohols by simple ordinary distillation. Moreover, the use of drying agents particularly at elevated temperatures is unsatisfactory since many of the alcohols, in particular the tertiary alcohols, tend to dehydrate to form the corresponding olefin. In accordance with the present invention these alcohols can be dried substantially completely by extractive distillation with a diol.

Suitable diols which can be utilized in the process of the instant invention are ethylene glycol, diethylene glycol, triethylene glycol, propylene glycol, dipropylene glycol, tripropylene glycol, 1,2- and 1,3-butylene glycol, 1,2-, 1,3-, 1,4-, 1,5- 2,3- and 2,4-pentanediol, 2-methyl-2,4-pentanediol; 2-ethyl-1,3-hexane diol; 1,6-hexane diol; 2,3-hexanediol; 2,4-heptane diol; isobutylene glycol; 1,4-isoamylene glycol; inacol and the like. In general, diols having from 2 to 8 carbon atoms in the molecule can be utilized. Ethylene glycol is particularly suitable for carrying out the process of this invention.

The method of this invention may be carried out either in a batch system or a continuous system. In the batch system the alcohol-water mixture is introduced through a receiver which can be heated and which is fitted with a fractionating column into which the diol may be introduced. The diol is introduced into the fractionating column at a point near the top of the column so that preferably there is some fractionation above the point of introduction in order to prevent carryover of the diol with the dried alcohol vapor. The diol is introduced at a temperature approximately the same as the boiling point of the mixture in the receiver. The amount of diol introduced into the column is preferably such that it will occupy between 15 and 50 percent of the vapor space in the column, i.e. the vapor in the column will be between about 15 and 50 mole percent diol. While higher amounts can be used they have not been found to be advantageous. In general, amounts ranging between about 30 percent and 50 percent are satisfactory.

In the batch process the mixture of alcohol and water are heated to boiling and the diol is introduced into the column at a rate such that the desired quantity is contained in the column. The alcohol substantially free of water is withdrawn overhead from the column while the diol and water accumulate in the receiver until finally all of the alcohol has been distilled.

In the continuous system the feed consisting of the alcohol-water mixture is introduced into a fractionating tower near the bottom and the diol is introduced into the tower near the top. The bottom of the tower is provided with a reboiler system to supply the necessary heat for fractionation. The bottoms from the tower consisting of water and the diol passes through the reboiler where it is heated by indirect or direct heat and a portion of the bottoms liquid thus heated and partially vaporized is recyled to the lower part of the column. The remaining portion consisting of water and diol is withdrawn. The overhead vapors consisting of the substantially dry alcohol is withdrawn from the tower and condensed. If desired, a portion of the condensate can be returned as recycle to the top of the tower. Such a system is in accordance with conventional engineering practices in extractive distillation processes and many modifications thereof are known and can be used.

The continuous system is further described by reference to the drawing wherein numeral 1 refers to the fractionation tower or extractive distillation zones into which is introduced through line 2 the alcohol-water mixture and the diol through line 3. The bottoms from the tower consisting of water and the diol is removed through line 4, passed through reboiler 5 wherein the bottoms are heated. The heated liquid is passed through line 6 and a portion is returned through line 7 to the tower to provide the heat necessary for the distillation. The remaining portion of the bottoms is removed through line 8. The overhead vapors consisting of the dry alcohol is withdrawn from the tower through line 9 and passed to condenser 10 and from condenser through line 11 to receiver 12. A portion of the condensate can be returned to the top of the tower through line 13 as reflux and the remainder of the condensate is withdrawn from the receiver through line 14.

In order to illustrate the invention in greater detail the following examples are provided. It will be understood, however, that the invention should not be construed as being limited thereto.

Example I.—A run was carried out in which 201 grams of the mixture of 88 weight percent tertiary butyl alcohol and 12 weight percent water (the composition of the minimum boiling azeotrope mixture) was charged to a flask provided with a Todd column modified so that solvent could be introduced into the column near the top of the column. Ethylene glycol at a temperature of approximately 89° C. was introduced into the top of the column at the rates should in Table I. A 10/1 reflux ratio was utilized with a distillate rate of 0.4 ml./minute. The individual overhead fractions are shown in Table I.

TABLE I

| Fraction No. | Ovhd. (° C.) | Btms. (° C.) | Wt. of fraction (g.) | Wt. percent (total) |
|---|---|---|---|---|
| 1[1] | 88.5 | 89 | 18.81 | 9.4 |
| 2[1] | 88.5 | 93.5 | 20.25 | 14.5 |
| 3[1] | 88.5 | 99 | 19.53 | 29.1 |
| 4[1] | 89.0 | 103 | 16.89 | 37.6 |
| 5[2] | 89.5 | 113 | 17.74 | 46.3 |
| 6[2] | 90.0 | 123 | 16.83 | 54.8 |

[1] Solvent introduction rate 1.0 ml./min. and 32.2 mole percent solvent in the vapor space of the column.
[2] Solvent introduction rate 1.5 ml./min. and 41.7 mole percent solvent in the vapor space of the column.

Fractions 1 to 4 inclusive had a water content of 0.5 weight percent, fractions 5 and 6 had a water content of 0.3 weight percent, thus demonstrating the efficiency of this method for removing water from the tertiary butyl alcohol.

Example II.—A similar run was carried out using the same apparatus with 100 grams of an 88 weight percent tertiary butyl alcohol, 12 weight percent water mixture. A reflux ratio of 10/1 was employed with a distillate rate of 0.35 ml./minute. The solvent employed was diethylene glycol and the solvent introduction rate is shown in Table II. The individual overhead fractions are also shown in Table II.

TABLE II

| Fraction No. | Ovhd. (° C.) | Btms. (° C.) | Wt. of fraction (g.) | Wt. percent (total) |
|---|---|---|---|---|
| 1[1] | 87 | 92 | 7.51 | 7.5 |
| 2[1] | 87 | 98 | 7.48 | 15.0 |
| 3[1] | 87 | 104 | 4.37 | 19.4 |
| 4[2] | 87.5 | 120 | 14.94 | 34.3 |

[1] Solvent introduction rate 1.5 ml./min. and 32.3 mole percent solvent in the vapor space of the column.
[2] Solvent introduction rate 2.2 ml./min. and 41.1 mole percent solvent in the vapor space of the column.

Example III.—Another run was carried out in the same apparatus utilized in Examples I and II with a charge consisting of 72 weight percent n-propyl alcohol and 28 weight percent water, the azeotropic mixture of n-propyl alcohol and water. Ethylene glycol was employed as the solvent and was introduced into the column at the rate of 2 ml./minute and the solvent concentration in the vapor space of the column was 47.5 mole percent. A reflux ratio of 10/1 was employed with 0.33 ml./minute distillate rate. The results obtained are shown in Table III.

TABLE III

| | Wt. percent | Wt. percent n-propyl alcohol | Wt. percent water |
|---|---|---|---|
| Charge | | [1] 72.0 | [1] 28.0 |
| Overhead | 43.5 | 97.3 | 2.7 |
| Bottoms[2] | 56.5 | 52.7 | 47.3 |

[1] Azeotropic mixture.
[2] Solvent-free basis.

These results show that n-propyl alcohol can be dried in accordance with the method in this invention.

As many possible embodiments can be made of this invention without departing from the broad scope thereof, it is to be understod that all matter herein set forth is to be interpreted as illustrative and not as unduly limiting the invention.

I claim:
1. The method of separating water from a single alkanol having from 3 to 7 carbon atoms and admixed substantially solely with water which consists essentially of subjecting the binary mixture to extractive distillation by contacting said alkanol-water mixture in a fractional distillation zone with ethylene glycol, while raising the temperature in said zone to above the boiling point of said mixture thereby removing the alkanol from the top of the fractional distillation zone and the water and the ethylene glycol from the bottom of the fractional distillation zone.

2. The method according to claim 1 wherein the amount of solvent in the fractional distillation zone is in the range of from 15 to 50 percent of the vapor space in the zone.

3. The method according to claim 1 wherein the alcohol is tertiary butyl alcohol.

4. The method according to claim 1 wherein the alcohol is n-propyl alcohol.

References Cited

UNITED STATES PATENTS

| 1,469,447 | 10/1923 | Schneible | 203—19 |
| 2,559,520 | 7/1951 | Smith et al. | 203—64 |
| 2,591,671 | 4/1952 | Catterall | 203—18 |
| 2,591,672 | 4/1952 | Catterall | 260—643 |
| 2,979,520 | 4/1961 | Kenton | 260—643 |

WILBUR L. BASCOMB, JR., Primary Examiner

U.S. Cl. X.R.

203—64; 260—643